United States Patent [19]

Kozbur et al.

[11] Patent Number: 4,951,891
[45] Date of Patent: Aug. 28, 1990

[54] WEB SLITTER AND GROOVER SYSTEM

[75] Inventors: Nestor Kozbur; Richard Shankel, both of Antioch, Calif.

[73] Assignee: James River Corporation, Oakland, Calif.

[21] Appl. No.: 298,934

[22] Filed: Jan. 23, 1989

[51] Int. Cl.$^5$ ............ B26D 7/06; B65H 35/02
[52] U.S. Cl. ............... 242/56.200; 242/56 R; 242/56.3; 242/56.4; 242/56.6; 242/56.7; 83/98; 83/156
[58] Field of Search ........ 242/56 R, 56.2, 56.3, 242/56.4, 56.5, 56.6, 56.7, 56.8, 56.9; 83/56, 425.1, 428, 471.2, 407

[56] References Cited

U.S. PATENT DOCUMENTS

| | | | |
|---|---|---|---|
| 3,038,598 | 4/1960 | Layton et al. | 242/1 |
| 3,089,659 | 5/1963 | Perrin | 242/55.2 |
| 3,282,525 | 11/1966 | Rehr | 242/56.2 |
| 3,760,697 | 9/1973 | Besemann | 83/428 |
| 4,013,236 | 3/1977 | Perrin | 242/1 |
| 4,431,141 | 2/1984 | Schutz | 242/67.1 R X |
| 4,484,500 | 11/1984 | Reba et al. | 83/98 |
| 4,499,801 | 2/1985 | Reba et al. | 83/24 |

Primary Examiner—Daniel P. Stodola
Assistant Examiner—Joseph A. Rhoa
Attorney, Agent, or Firm—Thomas R. Lampe

[57] ABSTRACT

A system for forming first and second spaced circular grooves in a roll produce and including a first and second web cutting assemblies alternately and sequentially movable to form web segments of diminished width along spaced portions thereof which, when wound, form the grooves.

5 Claims, 3 Drawing Sheets

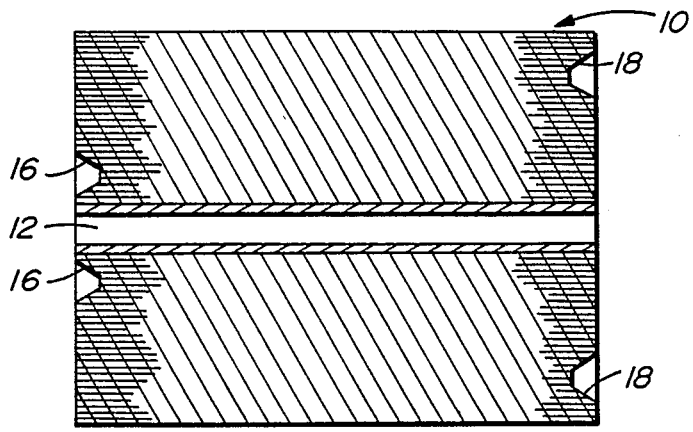
FIG._1
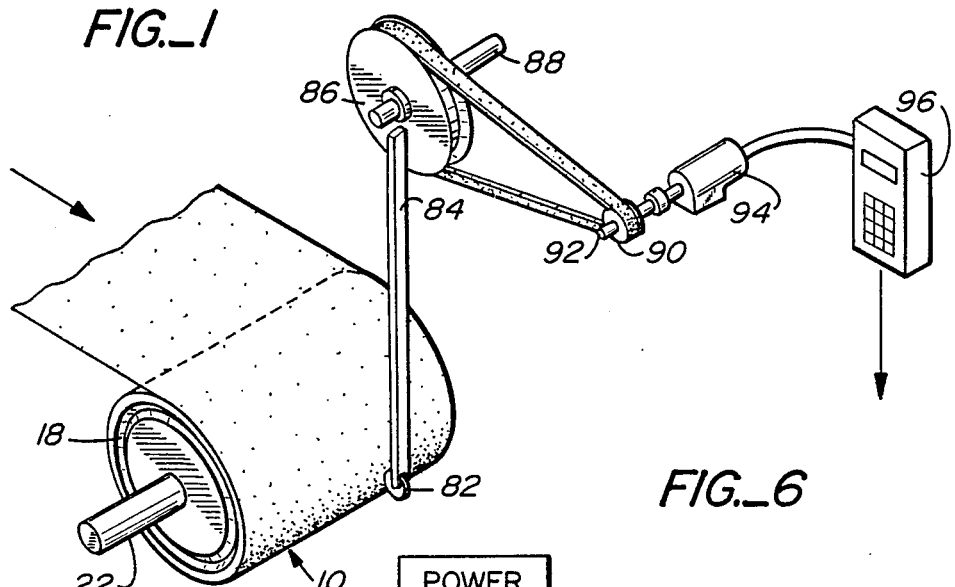
FIG._6
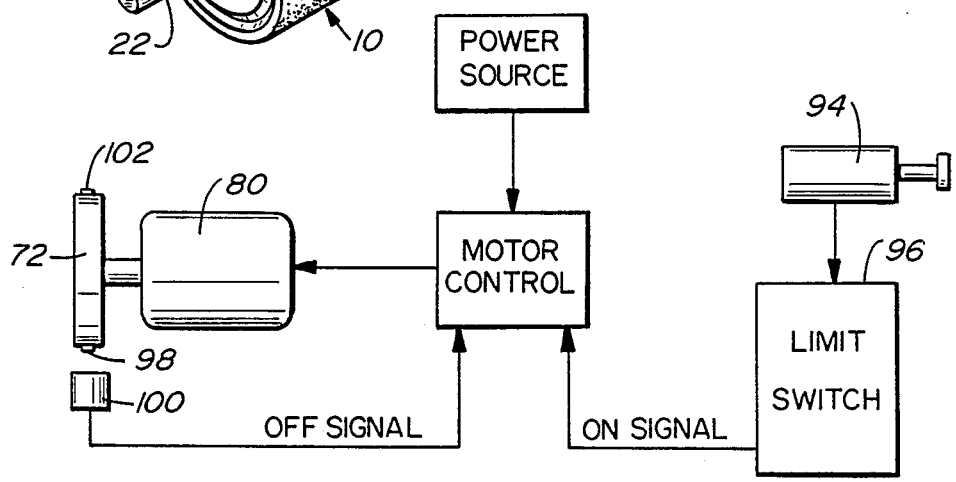
FIG._7

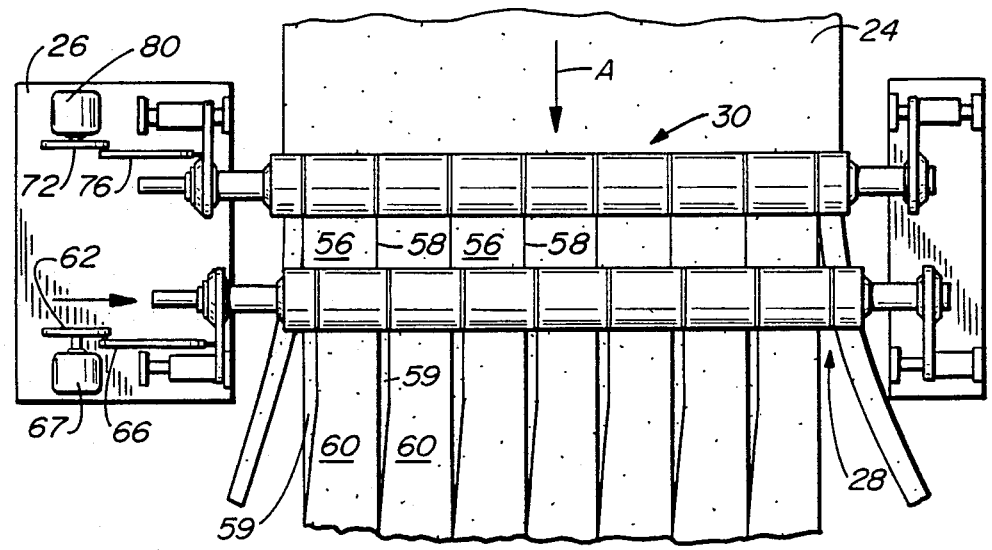
FIG._2
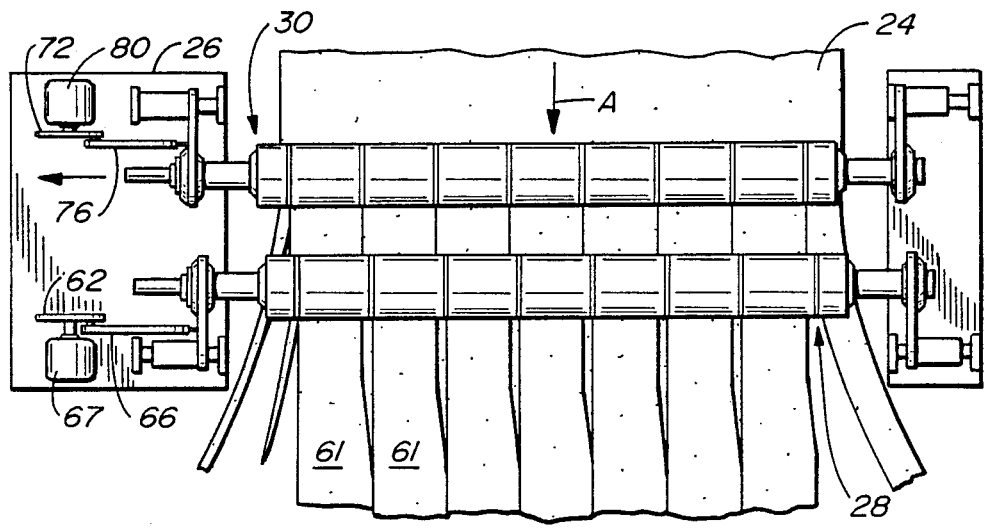
FIG._3

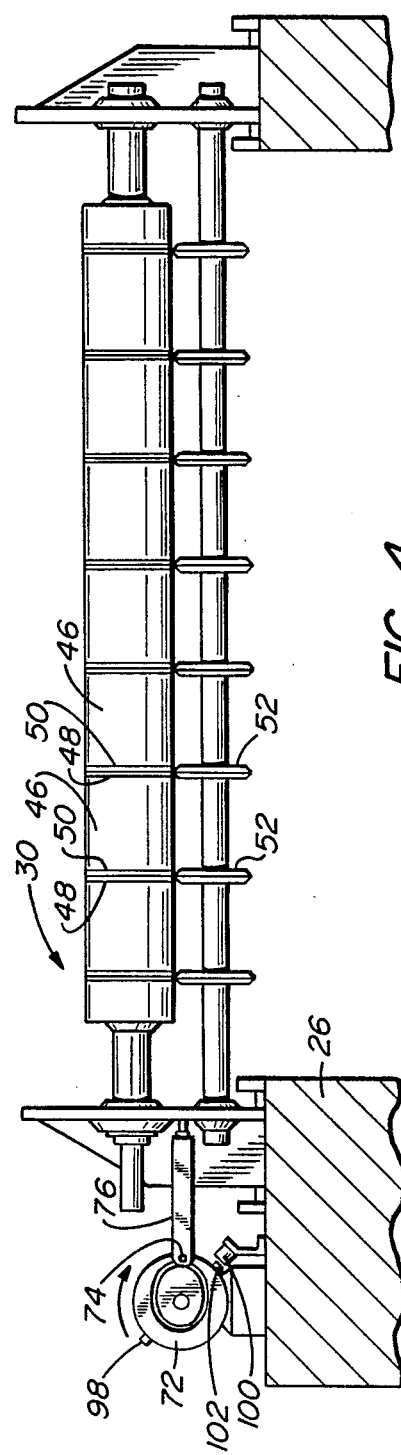
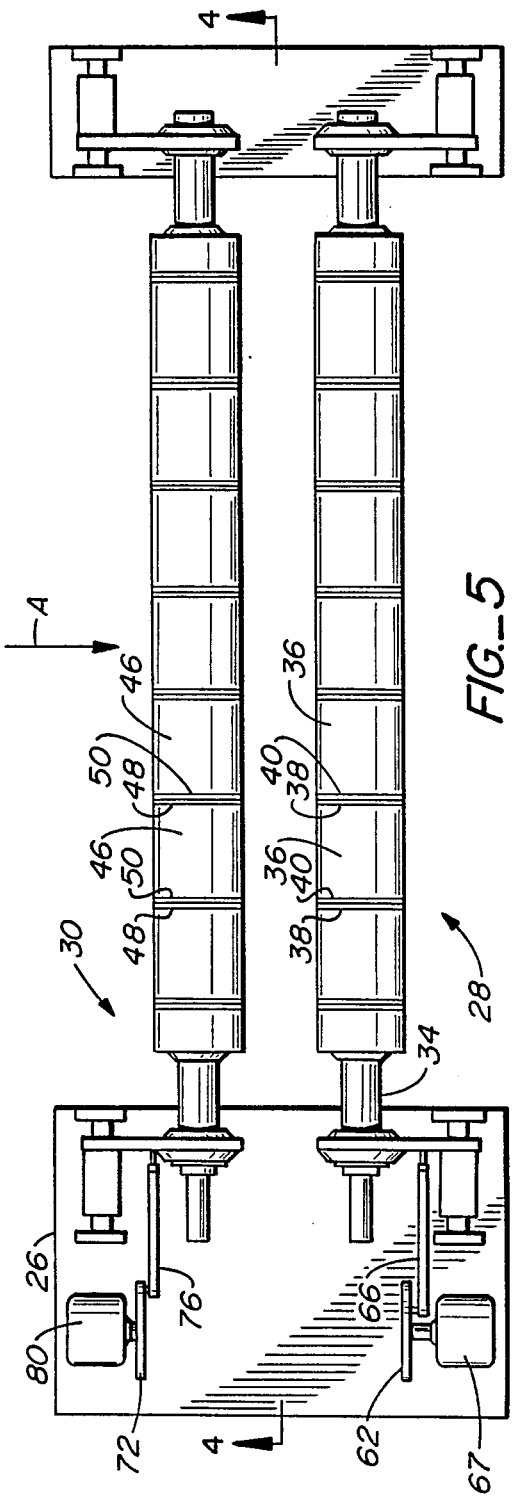

WEB SLITTER AND GROOVER SYSTEM

TECHNICAL FIELD

This invention relates to a system for making a plurality of spirally wound roll products from a web of sheet material moving along a predetermined path of movement. More particularly, the roll products made by the apparatus and method of the present invention, which may be, for example, roll paper towels, have first and second spaced, circular end grooves, the second groove being located a distance further from the center of the roll product than the first groove.

BACKGROUND ART

U.S. Pat. No. 3,282,525, issued Nov. 1, 1966, illustrates an apparatus and method for producing spirally wound paper roll products having a groove formed at an end thereof. A roll paper product of the type produced by the method and apparatus of U.S. Pat. No. 3,282,525 is illustrated in U.S. Pat. No. 3,038,598, issued June 12, 1962.

U.S. Pat. No. 4,484,500, issued Nov. 27, 1984, and U.S. Pat. No. 4,499,801, issued Feb. 19, 1985, also disclose a system for slitting a parent roll to form grooved rolls. The device disclosed in these latter two patents is essentially of the type disclosed in U.S. Pat. No. 3,282,525 but also differs therefrom in several respects. These differences include the use of movable shear slitters and a Coanda nozzle apparatus for removing trim segments from the shear slitters.

The grooved roll product of U.S. Pat. No. 3,038,598 is adapted for use in a dispenser cabinet and to be automatically dismounted therefrom when it has been consumed to a predetermined extent. U.S. Pat. No. 3,089,659, issued May 14, 1963, discloses a method of automatically dismounting the roll product of U.S. Pat. No. 3,038,598. According to such method, the convolutions of the roll product forming the groove comprise a bearing wall which is used to support the roll product within the dispenser cabinet. Automatic dismounting of the roll occurs when it is diminished by dispensing to the grooved location.

DISCLOSURE OF INVENTION

The present invention also relates to a method and apparatus for creating a grooved roll product. The particular roll product has two grooves, the second groove being located a distance further from the center of the roll product than the first groove. The grooves may be formed in the same or opposed ends. A configuration of this type is particularly useful when the paper towel or other roll product has a large diameter. The inner groove may, for example, form the support bearing surface while the outer groove may be utilized with suitable cabinet structure to stabilize the roll or perform some other desirable function in association therewith.

The system according to the teachings of the present invention is not only particularly adapted to the formation of first and second spaced, circular grooves during manufacture of the roll product but also encompasses structure and method steps which provide for the highly accurate placement of the second or outer groove in the roll product.

The apparatus of the present invention includes a framework. The first web cutting assembly is movably mounted on the framework, the first web cutting assembly including a plurality of transversely spaced cutter blades disposed along the predetermined path of movement of a web of sheet material and engageable with the moving web to cut the web.

The apparatus also includes a second web cutting assembly movably mounted on the framework, the second web cutting assembly including a plurality of transversely spaced cutter blades disposed along the predetermined path of movement and engageable with the moving web to cut the web.

First and second drive means are employed for selectively moving the first and second web cutting assemblies, respectively, transverse to the predetermined path of movement. Control means is provided for controlling the first and second drive means to sequentially move the first and second web cutting assemblies to form web segments of diminished width along spaced portions thereof. Means is provided for winding the web segments into the spirally wound roll products and for forming the first and second spaced, circular grooves with the spirally wound web segment portions.

The location of the first or inner groove on the formed roll product is not generally considered to be critical and movement of the first web cutting assembly can be actuated or triggered, for example, in response to the sensing of a predetermined length of sheet material moving to the location where the roll product is being wound or in response to the sensing of a predetermined number of revolutions of the roll product during winding thereof.

On the other hand, a groove formed at the outer extent of the roll product presents more difficult problems if accurate placement is to be obtained. The actuation of the second web cutting assembly cannot be triggered, for example, based upon a predetermined length of sheet material having been wound or upon the number of winding roll product rotations because accurate placement of the second or outer groove cannot be obtained due to such factors as variable web caliper and variations in web tension during the winding operation.

Apparatus constructed in accordance with the teachings of the present invention includes control means associated with the means for winding the roll products adapted to sense when the roll products being wound thereby attain a first predetermined diameter. The drive means operatively associated with the second cutting assembly is activated when this first predetermined diameter is sensed to move the second cutting assembly transverse to the predetermined path of web movement. The preferred illustrated embodiment of the sensing means includes a rider roll in engagement with at least one of the roll products during winding thereof and a rotatable first shaft operatively associated with the rider roll and rotatable responsive to movement of the rider roll during winding of the roll product.

A second shaft is spaced from the first shaft and interconnected therewith by transmission means. The transmission means is responsive to rotation of the first shaft to rotate the second shaft to a greater degree of angular displacement than the angular displacement of the first shaft.

The second shaft is operatively associated with a resolver device producing an output signal varying according to the angle of displacement of the second shaft. Switch means comprising a programmable limit switch is in operative association with the resolver device and adapted to receive the output signal from the resolver device Other features, advantages, and objects of the present invention will become apparent with reference to the following detailed description and the accompanying drawings.

BRIEF DESCRIPTION OF DRAWINGS

FIG. 1 is a cross-sectional side view of a paper towel produced by the present system;

FIGS. 2 and 3 are diagrammatic plan views of a portion of apparatus constructed in accordance with the teachings of the present invention slitting a parent web at different steps of the invention method;

FIG. 4 is an end view illustrating details of one of the web cutting assemblies of the apparatus;

FIG. 5 is a plan view of the two web cutting assemblies of the apparatus;

FIG. 6 is a diagrammatic, perspective view illustrating components of sensing means incorporated in the apparatus; and FIG. 7 is a simplified diagrammatic illustration showing the operative relationship between a component of the sensing means and drive means associated with a web cutting assembly.

BEST MODE FOR CARRYING OUT THE INVENTION

FIG. 1 illustrates a spirally wound roll product which has been produced by the system of the present invention. In the disclosed embodiment, the roll product is a paper towel 10 comprising a core 12 about which layers of paper have been wound. A groove 16 has been formed at one end thereof, said groove 16 circumferentially extending about core 12. A second groove 18 is formed at the other end paper towel 10. Groove 18 is also circular and is located a distance further from the center of the roll product than said first groove.

The system of the present invention produces a plurality of paper towels 10 simultaneously. As is conventional, paper towels 10 are wound in side-by-side fashion on a mandrel of a rewinder. A rewinder mandrel 22 with one paper towel 10 thereon is shown in FIG. 6.

The towels 10 are formed from a web 24 of paper sheet material moving along a predetermined path of movement as shown in FIGS. 2 and 3. The web passes a framework 26 upon which is mounted a first web cutting assembly 28 and a second web cutting assembly 30 positioned upstream therefrom. For the sake of illustration, the web cutting assemblies are shear slitters. First web cutting assembly 28 (see also FIG. 5) includes a shaft 34 having a plurality of sleeves 36 about the periphery thereof to define grooves 38. As is conventional, a plurality of anvil knives 40 are positioned between the sleeves 36. Circular knife blades (not shown) are positioned within the grooves to define spaced shear slitters with the anvil knives.

Second web cutting assembly 30 (see also FIGS. 4 and 5) is of the same general configuration as first web cutting assembly 28. In the second web cutting assembly, the sleeves are identified by reference numeral 46, the grooves by reference numeral 48, the anvil knives by reference numeral 50, and the circular knife blades by reference numeral 52.

Web 24 moves continuously in the direction of arrow A, the usual source of such web being a parent roll (not shown). Thus, the web 24 first passes by, and is severed by the knives of, second web cutting assembly 30. Knives 50, 52 of second web cutting assembly 30 cut the web and form a plurality of web segments 56, each of which is to be subsequently wound into a separate paper towel 10 at the rewinder.

The web 24 then proceeds to first web cutting assembly 28. Normally, the knives of the first web cutting assembly are in alignment with those of the second web cutting assembly; therefore, the knives of first web cutting assembly 28 track in the lines of cut 58 formed in the web by the knives of second web cutting assembly 30. That is, the lines of cut 58 are parallel with each other and in the direction of movement of web 24.

The paper towel grooves 16 and 18 are formed by temporarily bringing the knives of one web cutting assembly out of alignment with the knives of the other web cutting assembly. Suitable drive means are operatively associated with each of the web cutting assemblies to move them transverse to the predetermined path of movement of web 24. First the first web cutting assembly is moved to the right as shown in FIG. 2 while keeping the second web cutting assembly stationary. This results in the formation of strips 59 which separate from the rest of the web and result in a first portion of diminished width 60 in each of the web segments. In the arrangement illustrated, the first drive means for selectively moving the first web cutting assembly 28 transverse to the predetermined path of movement includes a grooved cam element 62. A follower element (not shown) is disposed in the groove of cam element 62 in a well known manner. A structural member 66 connects the follower element to a portion of the first web cutting assembly 28 so that rotation of the cam will cause a reciprocal movement of the first web cutting assembly. Cam element 62 is connected to any suitable prime drive mechanism such as motor 67 which may be energized and deenergized by a suitable control associated with the rewinder. Another preferred approach is to connect the cam element directly to the drive of the rewinder through a suitable clutch mechanism (not shown) which is engaged and disengaged in a programmed sequence to determine the position and shape of the groove 16 in the finished paper towel product. It will be appreciated that groove 16 is formed by a first portion of diminished width 60.

Formation of groove 18 becomes a much more critical operation. Groove 18 is obviously formed after the formation of groove 16 and after first web cutting assembly 28 has returned to its normal alignment position.

When the web 24 is slit to form groove 18, first web assembly 28 remains stationary in its normal position and second web cutting assembly 30 is moved relative thereto, said movement being in a direction opposite to that traversed by first web cutting assembly when slitting the web to form groove 16. In FIG. 2, for example, first web cutting assembly 28 was moved to the right. In FIG. 3 second web cutting assembly 30 has moved to the left. This is because the illustrated paper towel 10 has groove 16 disposed at one end thereof and groove 18 disposed at the other end thereof.

Movement of the second web cutting assembly 30 to the left as shown in FIG. 3 will result in the formation of a second portion diminished width 61 in each web segment. When such portion 61 is wound into a paper towel it will form groove 18.

As with the first web cutting assembly 28, movement of the second web cutting assembly 30 is accomplished by means of a grooved cam 72 having a follower element 74 (FIG. 4) disposed therein. A structural member 76 interconnects the second web cutting assembly 30 to the follower element 74.

Because groove 18 is positioned adjacent to the outer periphery of the paper towel 10, the grooved cam element 72 cannot be triggered or actuated by a sensing means which relies merely on the revolutions of the rewinder mandrel to initiate same or upon sensing the length of web material passing to the rewinder. This is because, as stated above, such factors as caliper variances or variations in web tensioning can cause premature or delayed cutting of the web segment second diminished width portion 61 which forms groove 18.

Referring now to FIGS. 2 and 3, it may be seen that the grooved cam element 72 which is operatively associated with second web cutting assembly 30 is driven directly by a motor 80. The motor 80 is activated by control means which includes sensing means operatively associated with the rewinder and adapted to sense when the roll products being wound thereon attain a first predetermined diameter.

FIG. 6 shows in somewhat schematic fashion one of the paper towels 10 being wound at the rewinder location. A rider roll 82 engages the outer peripheral surface of the towel 10 as it is being wound. Rider roll 82 is rotatably mounted at the end of a lever 84, the other end of lever 84 being attached to a sheave 86. Sheave 86 is fixedly positioned on a first shaft 88 which is journalled in any suitable fashion (not shown) on the rewinder framework A belt interconnects sheave 86 to a second smaller sheave 90 affixed to a second shaft 92. It will be appreciated that with this arrangement rotation of the first shaft to a predetermined degree of angular displacement will rotate the second shaft to a considerably greater degree of angular displacement, in the order of 10 times greater, for example. The second shaft 92 is the input shaft of a transducer in the form of a resolver 94 which may, for example, be a Gemco Quik-Set II resolver manufactured by the Gemco Electric Division of McGraw-Edison Company, Clausen, Mich.

Resolver transducer 94 sends an analog signal to a micro-computer based programmable limit switch which may be, for example, the Gemco Quik-Set II programmable limit switch also manufactured by Gemco Electric Division of McGraw Edison Company, Clausen, Mich. The programmable limit switch is identified by reference numeral 96.

When the programmable limit switch 96 receives an analog signal from resolver 94 indicating that second shaft 92 has rotated a predetermined degree, it in turn sends a signal to the control for motor 80 to actuate same. This is illustrated in FIG. 7. It will be appreciated that this will occur only after the diameter of paper towel 10 has been sensed with a very high degree of accuracy. This is at least partially due to the fact that it takes very little rotation of first shaft 88 to cause considerable movement of second shaft 92.

Actuation of motor 80 and the consequent rotation of cam element 72 causes the second web cutting assembly 30 to move to the left as viewed in FIG. 3. A metal flag 98 (FIGS. 4 and 7) is operatively associated with cam element 72 and rotates therewith. When the cam element rotates a sufficient degree to bring flag 98 next to a metal proximity switch 100, the motor 80 is deactivated temporarily. Thus, the web segment portion of diminished width produced by bringing the knives of second web cutting assembly 30 out of alignment with the knives of first web cutting assembly 28 will have a line of cut paralleling the line of cut produced by the knives of the first web cutting assembly. As this second web segment diminished width portion is wound at the rewinder, it will, of course, produce a groove having a flat wall in the interior thereof.

After the paper towel 10 shown in FIG. 6 reaches a second predetermined diameter the programmable limit switch 96 sends another signal to the control for motor 80 to reactivate same. This results in continued rotation of cam element 72 until a second metal flag 102 attached thereto reaches the switch 100, as shown in FIG. 4. This will terminate the cycle with the knives of the second web cutting assembly back into alignment with the knives of the first web cutting assembly. Because it is the diameter of the paper towel 10 being wound which controls both initiation and termination of groove formation, not only is the location of groove 18 precisely fixed, but the exact size and configuration of the groove can be attained with a high degree of accuracy.

What is claimed:

1. Apparatus for making a plurality of spirally wound roll products from a web of sheet material moving along a predetermined path of movement, each of said roll products having first and second spaced, circular grooves formed in at least one end thereof, said second groove being located a distance further from the center of the roll product then said first groove, said apparatus comprising, in combination:

a framework;

a first web cutting assembly movably mounted on said framework, said first web cutting assembly including a plurality of transversely spaced cutter blades disposed along said predetermined path of movement and engageable with said moving web to cut said web;

a second web cutting assembly movably mounted on said framework, said second web cutting assembly including a plurality of transversely spaced cutter blades disposed along said predetermined path of movement and engageable with said moving web to cut said web;

first drive means for selectively moving said first web cutting assembly transverse to said predetermined path of movement;

second drive means for selectively moving said second web cutting assembly transverse to said predetermined path of movement;

control means for controlling said first and second drive means to sequentially move said first and second web cutting assemblies to form web segments of diminished width along spaced portions thereof; and means for winding said web segments into said spirally wound roll products and form said first and second spaced, circular grooves with the spirally wound web segment portions, said control means including sensing means operatively associated with said winding means adapted to directly sense when the roll products being wound by said winding means attain a first predetermined diameter, and for activating at least one of said drive means to move a cutting assembly transverse to said predetermined path of movement when said first predetermined diameter is sensed, said sensing means being mounted at said winding means and adjacent the outer peripheral surface of at least one of said roll products to directly sense the location of the outer peripheral surface of said at least one roll product relative to said sensing means.

2. Apparatus according to claim 1 wherein said sensing means includes a rider roll in engagement with at least one of said roll products and a rotatable first shaft operatively associated with said rider roll and rotatable responsive to movement of said rider roll during winding of said at least one roll product, said control means additionally comprising switch means activated in response to rotation of said first shaft to a first predetermined degree of angular displacement.

3. Apparatus according to claim 2 wherein said sensing means additionally includes a second shaft spaced from said first shaft and transmission means interconnecting said first and second shafts, said transmission means responsive to rotation of said first shaft to rotate said second shaft to a greater degree of angular displacement than the angular displacement of said first shaft.

4. Apparatus according to claim 3 wherein said second shaft is operatively associated with a resolver device producing an output signal varying according to the angle of displacement of said second shaft, said switch means comprising a programmable limit switch in operative association with said resolver device and adapted to receive the output signal from said resolver device.

5. Apparatus according to claim 1 wherein said sensing means is further adapted to sense when the roll products being wound by said winding means attain a second predetermined diameter, said second web cutting assembly being movable between a first position and a second position by said second drive means to form a web segment of diminished width, said apparatus control means additionally comprising means for deactivating said second drive means when said second web cutting assembly moves to said second position and for reactivating said second drive means to return said second cutting assembly to said first position when said sensing means senses that the roll products being wound by said winding means attain said second predetermined diameter.

* * * * *